United States Patent
Petridis et al.

(10) Patent No.: US 9,995,229 B2
(45) Date of Patent: Jun. 12, 2018

(54) METHOD OF CONTROLLING THE STOPPING AND STARTING OF AN ENGINE

(71) Applicant: FORD GLOBAL TECHNOLOGIES, LLC, Dearborn, MI (US)

(72) Inventors: Anthemios Philemon Petridis, Bishop's Stortford (GB); Donatus Andreas Josephine Kees, Billericay (GB); Urs Christen, Aachen NRW (DE)

(73) Assignee: Ford Global Technologies, LLC, Dearborn, MI (US)

( * ) Notice: Subject to any disclaimer, the term of this patent is extended or adjusted under 35 U.S.C. 154(b) by 341 days.

(21) Appl. No.: 15/043,860

(22) Filed: Feb. 15, 2016

(65) Prior Publication Data

US 2016/0245203 A1    Aug. 25, 2016

(30) Foreign Application Priority Data

Feb. 20, 2015   (GB) .................................. 1502881.4

(51) Int. Cl.
*F02D 41/02* (2006.01)
*F02N 11/08* (2006.01)
(Continued)

(52) U.S. Cl.
CPC ........ *F02D 41/022* (2013.01); *F02N 11/0822* (2013.01); *F02N 11/10* (2013.01);
(Continued)

(58) Field of Classification Search
CPC .. F02D 41/022; F02D 41/042; F02N 11/0822; F02N 2200/103; B60W 10/02; B60W 10/06
See application file for complete search history.

(56) References Cited

U.S. PATENT DOCUMENTS

| 5,392,274 A | 2/1995 | Smedley |
| 6,033,341 A | 3/2000 | Yamamoto et al. |
| (Continued) | | |

FOREIGN PATENT DOCUMENTS

| CN | 103758995 A | 4/2014 |
| EP | 2029916 A1 | 3/2010 |
| WO | 2010142916 A1 | 12/2010 |

OTHER PUBLICATIONS

Great Britain Search Report for Great Britain Application No. 1502881.4 dated Jul. 24, 2015.

*Primary Examiner* — Edwin A Young
(74) *Attorney, Agent, or Firm* — David B. Kelley; Brooks Kushman P.C.

(57) ABSTRACT

A method of stopping and starting an engine of a vehicle having a manually operated clutch system including a clutch for driveably connecting the engine to a transmission includes controlling stopping and starting of the engine based on first and second clutch engagement thresholds selected based on whether the clutch is being engaged or disengaged. The first threshold corresponds to a more disengaged state of the clutch than the second threshold. The first threshold is used when the clutch is being disengaged to decide whether the engine can be shut down while the transmission remains in-gear. The second threshold is used when the clutch is being engaged to decide whether the engine can be started while the transmission remains in-gear. By using a less conservative threshold for starting the engine than stopping the engine, the number of inhibited restarts is reduced.

20 Claims, 7 Drawing Sheets

(51) Int. Cl.
  *F02N 11/10* (2006.01)
  *F02D 41/06* (2006.01)
  *F02D 41/04* (2006.01)

(52) U.S. Cl.
  CPC .......... *F02D 41/042* (2013.01); *F02D 41/045* (2013.01); *F02D 41/065* (2013.01); *F02N 2200/102* (2013.01); *F02N 2200/103* (2013.01); *Y02T 10/48* (2013.01)

(56) References Cited

U.S. PATENT DOCUMENTS

| | | |
|---|---|---|
| 6,943,676 B2 | 9/2005 | Mack |
| 8,311,714 B2 | 11/2012 | Seufert et al. |
| 2006/0166788 A1 | 7/2006 | Buchhold |
| 2007/0267238 A1* | 11/2007 | Guy ................ B60K 28/04 180/272 |
| 2010/0113217 A1 | 5/2010 | Terwart et al. |
| 2010/0133058 A1 | 6/2010 | Doerr |
| 2011/0125377 A1 | 5/2011 | Saitoh |
| 2011/0295476 A1 | 12/2011 | Ellis |
| 2012/0196723 A1* | 8/2012 | Christen ......... B60W 30/18018 477/167 |
| 2013/0282247 A1 | 10/2013 | Burtch |
| 2014/0106932 A1* | 4/2014 | Kato ............... B60W 30/18018 477/83 |

\* cited by examiner

METHOD OF CONTROLLING THE STOPPING AND STARTING OF AN ENGINE

CROSS-REFERENCE TO RELATED APPLICATIONS

This application claims foreign priority benefits under 35 U.S.C. § 119(a)-(d) to GB 1502881.4 filed Feb. 20, 2015, which is hereby incorporated by reference in its entirety.

TECHNICAL FIELD

This invention relates to motor vehicles and in particular to a method for controlling the stopping and starting of an engine of a motor vehicle to improve fuel economy and reduce emissions.

BACKGROUND

For manual transmission vehicles that are fitted with automated Stop-Start control of the engine it is desired to maximize fuel economy by utilizing automated engine shut downs and restarts whenever possible. Stop-in-Neutral (SIN) Stop-Start systems are currently employed in the market place but these systems do not maximize fuel economy since many drivers wait in gear in a stationary vehicle. SIN stops are not invoked under these conditions and a Stop-in-Gear (SIG) strategy is required.

However to employ a Stop-in-Gear (SIG) Stop-Start strategy, it is necessary to ensure that the driveline is disengaged. SIG stops and starts may typically be invoked if both the clutch and brake pedals are depressed with the transmission in gear. However, if a driver-induced restart request is received from, for example, releasing of the brake pedal, the Stop-Start logic must only be allowed to crank the engine if the driveline is disengaged as this prevents the vehicle jerking or moving during cranking. Therefore current practice is to use a very conservative clutch pedal position threshold for the clutch pedal position that must be achieved if stopping of the engine is to be permitted.

There are two disadvantages with the use of such a conservative clutch pedal position threshold.

Firstly, if the driver allows the clutch pedal to move back in a clutch engaging direction while the engine is stopped (Pedal creep) then the engine cannot in some cases be restarted because the clutch pedal position will have traversed the clutch pedal position threshold to permit the engine to be restarted.

Secondly during take-off from rest it is common practice for a driver to begin to engage the clutch at the same time as the brake pedal is released and the driver is beginning to depress the accelerator pedal. If the timing of these events by the driver is slightly off, the driver can inadvertently allow the clutch pedal to move too rapidly in the clutch engaging direction thereby causing the clutch pedal position to traverse the clutch pedal position threshold before cranking has commenced and preventing the engine from being restarted.

In both cases opportunities for starting the engine are missed and the driver may be unsatisfied with the operation of the Stop-Start system to such an extent that they will switch it off.

SUMMARY

A method of controlling the stopping and starting of an engine is provided that reduces the number of missed opportunities for engine restarting.

According to a first aspect of the invention there is provided a method of controlling the stopping and starting of a motor vehicle engine driveably connected to a transmission by a manually operated clutch while the transmission remains in gear, the method comprising setting a first clutch disengagement threshold limit for when the clutch is being disengaged, setting a second clutch disengagement threshold limit for use when the clutch is being engaged, using the first disengagement threshold limit to decide whether to permit the engine to be stopped and using the second clutch disengagement threshold limit to decide whether to permit the engine to be restarted from the stopped state wherein the second clutch disengagement threshold limit is set at a less disengaged state of the clutch than the first clutch disengagement threshold limit. The first clutch disengagement threshold limit may be set such that the clutch will be disengaged sufficiently that no torque is transmitted by the clutch and the second clutch disengagement threshold limit may be set close to a bite point of the clutch such that any torque that is transmitted by the clutch is insufficient to move the motor vehicle to which the engine is fitted If the state of the clutch is more disengaged than the first clutch disengagement threshold limit, the engine may be stopped if at least one engine stop trigger is present. If the state of the clutch is less disengaged than the first clutch disengagement threshold limit, stopping of the engine may be inhibited even if the engine stop trigger is present. The engine stop trigger may be present if a brake pedal of the motor vehicle is sensed to be pressed.

If the state of the clutch is more disengaged than the second clutch disengagement threshold limit, starting of the engine may be permitted if at least one engine start trigger is present. If the state of the clutch is less disengaged than the second clutch disengagement threshold limit, starting of the engine may be inhibited even if the engine start trigger is present. The engine start trigger may be present if a brake pedal of the motor vehicle is sensed to be one of released and being released. Alternatively, the engine start trigger may be present if a brake pedal of the motor vehicle is sensed to be released and an accelerator pedal is sensed to be pressed.

The clutch may be actuated by a clutch actuation system including a slave cylinder having a piston arranged to move a release bearing of the clutch and a slave cylinder piston position sensor to provide an output signal indicative of the position of the piston of the slave cylinder, the first clutch disengagement threshold limit may be a first assigned value of output signal from the slave cylinder piston position sensor and, if the magnitude of the output signal from the slave cylinder piston position sensor is not less than the first assigned value of output signal from the slave cylinder piston position sensor, the clutch may be considered to be sufficiently disengaged to permit shutting down of the engine.

The clutch may be actuated by a clutch actuation system including a slave cylinder having a piston arranged to move a release bearing of the clutch and a slave cylinder position sensor to provide an output signal indicative of the position of the piston of the slave cylinder and the second clutch disengagement threshold limit may be a second assigned value of output signal from the slave cylinder piston position sensor and, if the magnitude of the output signal from the slave cylinder piston position sensor is not less than the second assigned value of output signal from the slave cylinder piston position sensor, the clutch may be considered to be sufficiently disengaged to permit starting of the engine.

According to a second aspect of the invention there is provided a motor vehicle having an engine driveably connected to a transmission by a manually operated clutch, an electronic controller to control the stopping and starting of the engine in response to inputs from a sensor arranged to provide an engine stop trigger signal, a sensor arranged to provide an engine start trigger signal and a sensor arranged to provide a signal indicative of the engagement state of the clutch wherein the electronic controller is operable to set a first clutch disengagement threshold limit for use when the clutch is being disengaged, set a second clutch disengagement threshold limit for use when the clutch is being engaged, use the first disengagement threshold limit to decide whether to permit the engine to be shut down and use the second clutch disengagement threshold limit to decide whether to permit the engine to be restarted and set the second clutch disengagement threshold limit at a less disengaged clutch state than the first clutch disengagement threshold limit.

The clutch may be actuated by a clutch actuation system including a slave cylinder having a piston arranged to move a release bearing of the clutch and a slave cylinder piston position sensor to provide an output signal indicative of the position of the piston of the slave cylinder.

The first clutch disengagement threshold limit may be a first assigned value of output signal from the slave cylinder piston position sensor and, if the magnitude of the output signal from the slave cylinder piston position sensor when checked by the electronic controller is not less than the first assigned value of output signal from the slave cylinder piston position sensor, the electronic controller may be operable to infer that the clutch is sufficiently disengaged to permit stopping of the engine.

If a stop trigger is present and the clutch is sufficiently disengaged to permit shutting down of the engine, then the engine may be stopped.

The second clutch disengagement threshold limit may be a second assigned value of output signal from the slave cylinder piston position sensor and, if the magnitude of the output signal from the slave cylinder piston position sensor when checked by the electronic controller is not less than the second assigned value of output signal from the slave cylinder piston position sensor, the electronic controller may be operable to infer that the clutch is sufficiently disengaged to permit starting of the engine.

If a start trigger is present and the clutch is sufficiently disengaged to permit starting of the engine, then the engine may be started.

The sensor arranged to provide an engine stop trigger signal may be a brake pedal sensor used to monitor the position of a brake pedal and the electronic controller may be operable to use the pressing of the brake pedal as an engine stop trigger.

The sensor arranged to provide an engine start trigger signal may be a brake pedal sensor used to monitor the position of a brake pedal and the electronic controller may be operable to use the releasing of the brake pedal as an engine start trigger.

The invention will now be described by way of example with reference to the accompanying drawings.

DETAILED DESCRIPTION

As required, detailed embodiments are disclosed herein; however, it is to be understood that the disclosed embodiments are merely representative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the embodiments.

Figure 1:
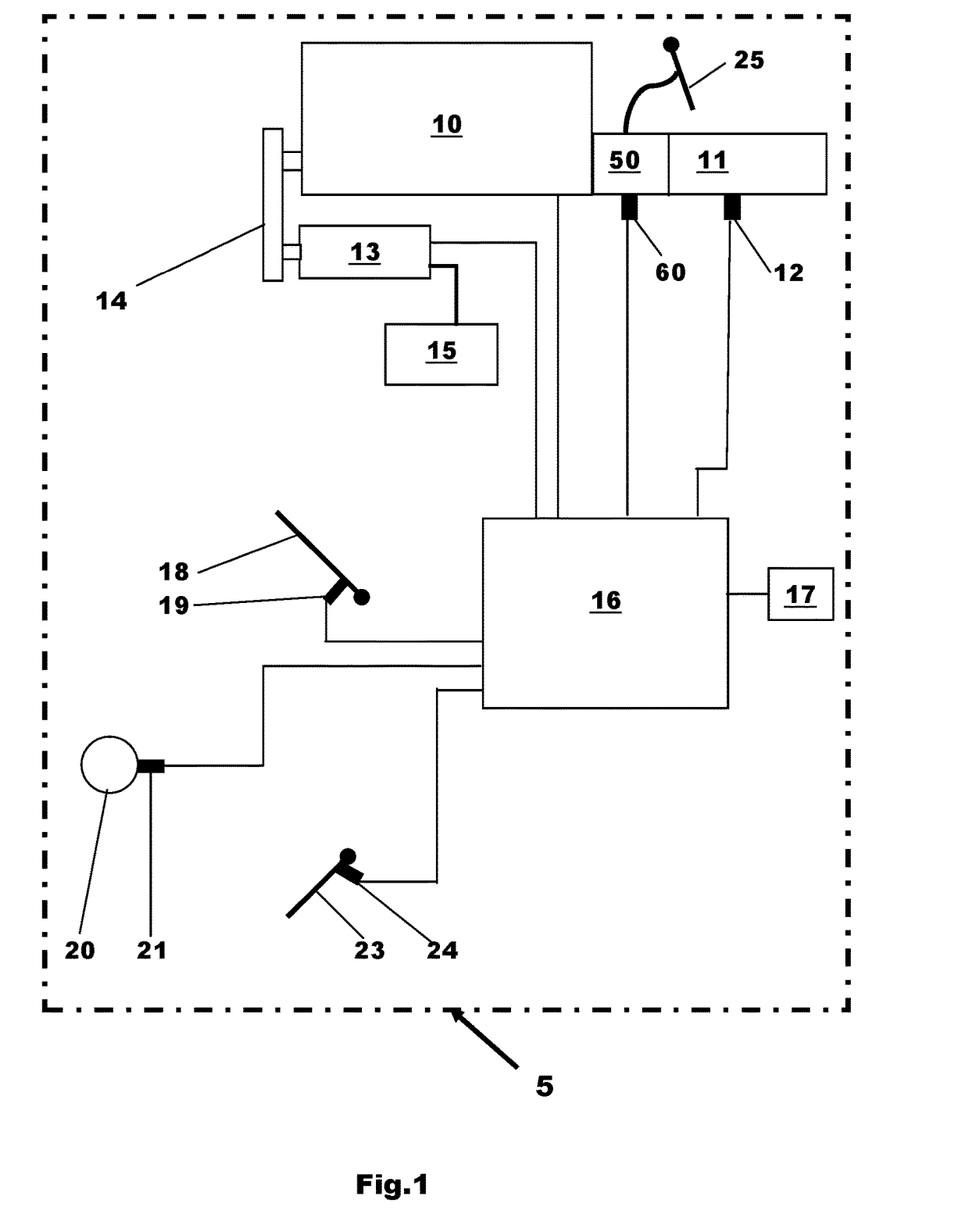
FIG. 1 is a schematic representation of a motor vehicle having a stop-start system.
Figure 2:
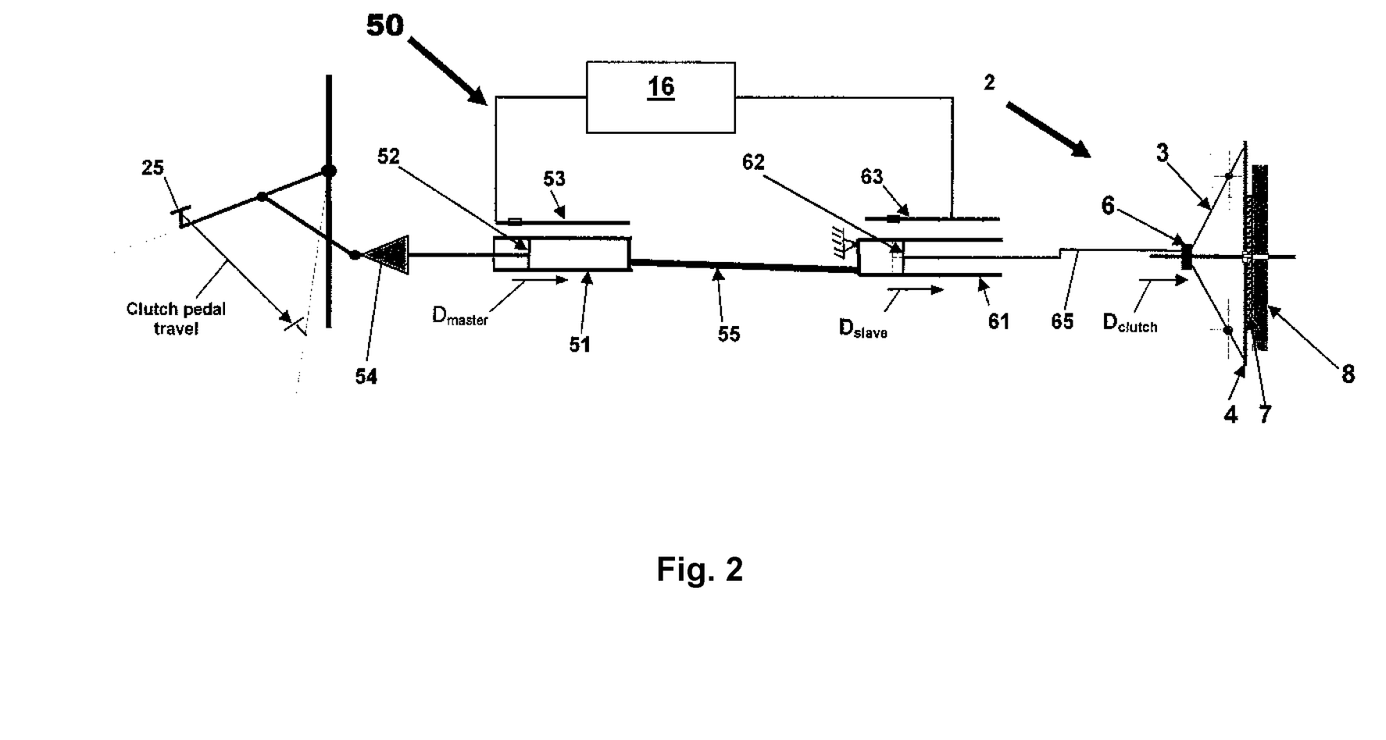
FIG. 2 is a schematic diagram of a clutch and a clutch actuation system used in the vehicle shown in FIG. 1.

With particular reference to FIGS. 1 and 2 there is shown a motor vehicle 5 having an engine 10 driving a multi-speed manual transmission 11. The transmission 11 is driveably connected to the engine 10 by a clutch system 50 which is manually engaged or released by a driver of the motor vehicle 5 using a clutch pedal 25.

The transmission 11 has a gear selector (not shown) that is moveable between several positions including at least one position where a gear forming part of the multi-speed transmission is selected and a neutral position in which no gears of the multi-speed transmission are selected. When the gear selector is moved to the neutral position the multi-speed transmission 11 is said to be in a 'neutral' state in which drive cannot be transmitted by the multi-speed transmission and when the gear selector is moved to an in gear position the multi-speed transmission 11 is said to be in an 'in-gear' state in which drive can be transmitted by the multi-speed transmission.

An engine starter in the form of in this case an integrated starter-generator (ISG) 13 is driveably connected to the engine 10 and in this case is connected by a flexible drive in the form of a drive belt or chain drive 14 to a crankshaft of the engine 10. The ISG 13 is connected to a source of electrical energy in the form of a battery 15 and is used as a motor to start the engine 10. The battery 15 is recharged by the ISG 13 when the ISG 13 is operating as an electrical generator. It will be appreciated that the ISG 13 could be replaced by a starter motor for starting the engine 10.

A driver operable on-off device in the form of a Human Machine Interface (HMI) embodied in this case in the form of a key operable ignition switch 17 is used to control the overall operation of the engine 10. That is to say, when the engine 10 is running the ignition switch 17 is in an 'on' position (key-on) and when the ignition switch 17 is in an 'off' position (key-off) the engine 10 is not able to run. The ignition switch 17 also includes a third momentary position used to manually start the engine 10. It will be appreciated that other HMI devices may be used to provide this functionality and that the invention is not limited to the use of a key operable ignition switch.

An electronic controller 16 is connected to the starter-generator 13, to the engine 10, to a gear selector sensor 12 used to monitor whether the transmission 11 is in neutral or in gear, to a road speed sensor 21 used to measure the rotational speed of a road wheel 20, to a brake pedal position sensor 24 used to monitor the position of a brake pedal 23, to a clutch master cylinder position sensor 53 used to monitor the position of a master cylinder piston 53 and indirectly the position of the clutch pedal 25 to which the master cylinder piston is mechanically connected, to a clutch slave cylinder position sensor 53 used to monitor the position of a slave cylinder piston 62 and to a throttle position sensor 19 used to monitor the position of an accelerator pedal 18.

The position of the master and slave cylinder pistons 52 and 62 may be measured by the sensors 53, 63 using any of a number of position sensing technologies such as, for example and without limitation, PLCD and Hall effect.

The accelerator pedal 18 provides a driver input of required power output from the engine 10. If the accelerator pedal 18 has been moved from a rest position it is said to be in a 'pressed position' or in a 'pressed state'.

It will be appreciated that the term gear selector sensor is not limited to a sensor that monitors the position of the gear selector but rather is any device which can provide a feedback of whether the transmission 11 is in gear or in neutral.

Similarly, the term brake pedal sensor is not limited to a sensor that monitors the position of the brake pedal but rather is any device that provides feedback of whether an operator of the motor vehicle 5 has applied pressure to the brake pedal 23 to apply the brakes of the motor vehicle 5. For example, the brake pedal sensor could monitor the pressure of fluid in one or more brake lines. When the brake pedal 23 has been pressed sufficiently to apply the brakes it is said to be in a pressed state or in a pressed position.

Referring now in particular to FIG. 2 it can be seen that the clutch system 50 comprises a clutch 2 and a hydraulic actuation system connecting the clutch 2 to the clutch pedal 25. The hydraulic actuation system comprises a mechanical linkage 54 connecting the clutch pedal 25 to the master cylinder piston 52 of a master cylinder 51, a hydraulic connection or conduit 55 connecting an output from the master cylinder 51 to one end of a slave cylinder 61 in which is slidingly mounted the slave cylinder piston 62 and a mechanical linkage 65 from the slave cylinder piston 62 to a release bearing 6 used to selectively release and engage the clutch 2.

It will be appreciated that a displacement of the clutch pedal 25 in the direction of the arrow 'clutch pedal travel' on FIG. 2 will produce corresponding displacements $D_{master}$ and $D_{slave}$ of the master and slave pistons 52 and 62 respectively in a clutch disengaging direction.

The clutch 2 is therefore in this case a push release type of friction clutch. It will however be appreciated that the invention could also be applied to a pull release type clutch.

The clutch 2 includes a cover and spring assembly 3, a pressure plate 4 and a driven plate 7 interposed the pressure plate 4 and a flywheel 8 attached to a crankshaft (not shown) of the engine 10. The clutch 2 is conventional in construction and is not described in detail, it is merely necessary to know that movement of the release bearing 6 in the direction of the arrow $D_{clutch}$ by the slave cylinder piston 62 is movement in a clutch disengaging direction and that movement of the release bearing 6 in an opposite direction is motion in a clutch engaging direction.

At some point during the range of motion of the release bearing 6 the state of the clutch 2 will change from a disengaged state in which substantially no torque can be transmitted by the clutch from the engine 10 to the transmission 11 to a partially engaged state where a small amount of torque can be transmitted. This position of clutch engagement is often referred to as the 'bite point'. The value of torque transmitted at the bite point will vary from vehicle to vehicle depending upon many factors including the mechanical ratio between the engine 10 and the driven wheels (not shown), the friction between the clutch plates and in the driveline, and the friction between the road wheels and the road. However, the magnitude of torque that can be transmitted at the bite point may be sufficient for a driver to feel a small jerk but is not sufficient to cause motion of the motor vehicle 5. The magnitude of transmittable torque at the bite point is typically in the range of 3 to 10 Nm.

The electronic controller 16 receives several signals from the engine 10 including a signal indicative of the rotational speed of the engine 10 from a speed sensor (not shown) and sends signals to the engine used to control shutdown and start-up of the engine 10. In this case the engine 10 is a spark ignited engine 10 and the signals sent from the electronic control unit 16 are used to control a fuel supply system (not shown) for the engine 10 and an ignition system (not shown) for the engine 10. If the engine 10 were to be a diesel engine then only the fuel supply to the engine would be controlled. The electronic controller 16 may comprise various components including a central processing unit, memory devices, timers and signal processing devices to convert the signals from the sensors connected to the electronic controller 16 into data which is used by the electronic controller 16 to control the operation and in particular the automatic stopping and starting of the engine 10. It will also be appreciated that the electronic controller 16 may be formed of several discrete electronic control units which communicate with one another to achieve the required functionality.

During normal engine running, the electronic controller 16 is operable to control the fuel supplied to the engine 10 and to adjust the ignition system so that sparks are supplied to the engine 10 from spark plugs at the correct timing to produce the desired engine torque.

The electronic controller 16 controls the operation of the engine 10 which is operable in two modes, a first or stop-start running mode and a second or manual running mode.

The primary factor used to determine whether the engine 10 is operated in the second mode or in the first mode in the case of this example is whether the motor vehicle 5 is moving. If the motor vehicle 5 is moving the engine is operated in the second mode and the engine 10 will be run continuously unless manually switched off by the driver and, if the motor vehicle 5 is not moving, the engine 10 will be run in the first mode in which automatic stop-start operation of the engine will occur providing other factors as described below indicate that stop-start operation is possible. It will be appreciated that the invention could be applied to a motor vehicle where the engine is shut-down with the transmission remaining in-gear while the motor vehicle is still moving sometimes referred to as a Rolling Stop-Start Vehicle.

In addition to the requirement for the vehicle 5 to be stationary, there may be other factors used to decide whether operation in the first mode is possible. For example, the state of charge of the battery 15 may need to be above a predefined level, the temperature of the engine 10 may need to be above a predefined level, the ambient temperature may need to be above a predefined value or an aftertreatment system may need to be up to temperature (light-off).

In the first or stop-start mode of operation, the engine 10 is selectively stopped and started by the electronic controller 16 without driver intervention when one or more predetermined engine stop and start conditions known as 'triggers' exist. These stop and start triggers are based upon the signals received by the electronic controller 16 from the throttle sensor 19, the brake sensor 24, the clutch system 50 and the gear selector sensor 12. The position or state of the clutch 2, the accelerator pedal 18, the brake pedal 23 and the transmission 11 are all different motor vehicle variables which are used to control the operation of the engine 10. It will be appreciated that many other variables can also be used including, but not limited to, the state of a parking brake and whether a stop-start manual inhibit switch has been activated by the driver.

When the engine 10 is operating in the second mode it is run continuously so long as the ignition switch 17 remains in the 'on' position and the engine 10 is stopped and started by manual operation of the ignition switch 17 by the driver.

Although the measurement of motor vehicle speed is described above with reference to the use of a road wheel sensor 21 because such sensors are often already present on a motor vehicle as part of a brake anti-lock system, it will be appreciated that other suitable means can be used to determine the speed of the motor vehicle 5 such as, for example, a sensor measuring the rotational speed of an output shaft from the transmission 11.

The motor vehicle 5 will operate in the following manner.

If the conditions for stop-start operation are not met then the engine is run continuously while the HMI 17 remains in a 'key-on' state and will be stopped when the state of the HMI 17 is changed to a key-off state.

When stop-start operation is possible, that is to say, the speed of the vehicle 5 as sensed by the vehicle speed sensor 21 is substantially equal to zero and any other conditions have been met, the electronic controller 16 controls the stopping and starting of the engine 10 as follows.

With the engine 10 running and the transmission 11 in-gear, it is checked whether the current engagement state of the clutch 2 is such that it is permissible to stop the engine 10.

This is done by comparing the output signal (OS) from the slave cylinder piston position sensor 63 with a predefined and set first threshold D_P.

The first threshold D_P is a very conservative threshold that is to say, it can be guaranteed taking into account tolerance and noise factors that the clutch 2 will be disengaged if OS≥D_P.

It will be appreciated that the slave cylinder piston position sensor 63 could include internal signal processing and that the output signal (OS) from the slave cylinder piston position sensor 63 could be an analog signal or a digital signal. It will also be appreciated that the output signal (OS) from the slave cylinder piston position sensor 63 could fall as the clutch pedal 25 is depressed in which case the test above would be replaced with: Is OS≤D_P?

In either case, when it has been confirmed that the clutch 2 is disengaged, the electronic controller 16 checks whether at least one engine stop trigger is present. For example, if the output from the brake pedal sensor 24 indicates that the brake pedal is being pressed, then this would constitute an engine stop trigger and stopping of the engine 10 is desirable in order to save fuel and reduce emissions from the engine 10.

Therefore, if an engine stop trigger is present, the engine 10 is stopped and otherwise the engine 10 is left in the running state.

The engine 10 is started from the stopped state if at least one engine start trigger is found to be present when checked by the electronic controller 16 and secondly, the engagement state of the clutch 2 is such that the engine 10 can be started. Regarding this second requirement, the output signal (OS) from the slave cylinder piston position sensor 63 is checked against the second predefined threshold D_R. The second threshold D_R is set to correspond approximately to the bite point of the clutch 2 and is therefore a relatively aggressive threshold.

If OS≥D_R, then restarting of the engine 10 is permitted and the ISG 13 is used to crank the engine 10. If the output signal (OS) from the slave cylinder piston position sensor 63 falls as the clutch pedal 25 is depressed, then the above test would be replaced with: Is OS≤D_R?

In either case, when it has been confirmed that the clutch 2 is not engaged sufficiently to cause a problem if the engine 10 were to be started, the electronic controller 16 uses the ISG 13 to crank the engine 10.

Therefore, in summary, two different threshold limits are set for use in determining when to start and stop the engine 10. The first threshold D_P is operative when the clutch 2 is being disengaged and the second threshold D_R is used when the clutch 2 is being engaged.

Because the first threshold D_P is more conservative than the second threshold D_R the driver can release the clutch pedal 25 slightly while the engine 10 is stopped without affecting the ability of the electronic controller 16 to restart the engine 10 if an engine start trigger occurs. Additionally, the difference between the first and second thresholds D_P and D_R provides the driver with a larger margin for error in terms of synchronizing the releasing of the clutch pedal 25 with the triggering of the restart.

Figure 7A:
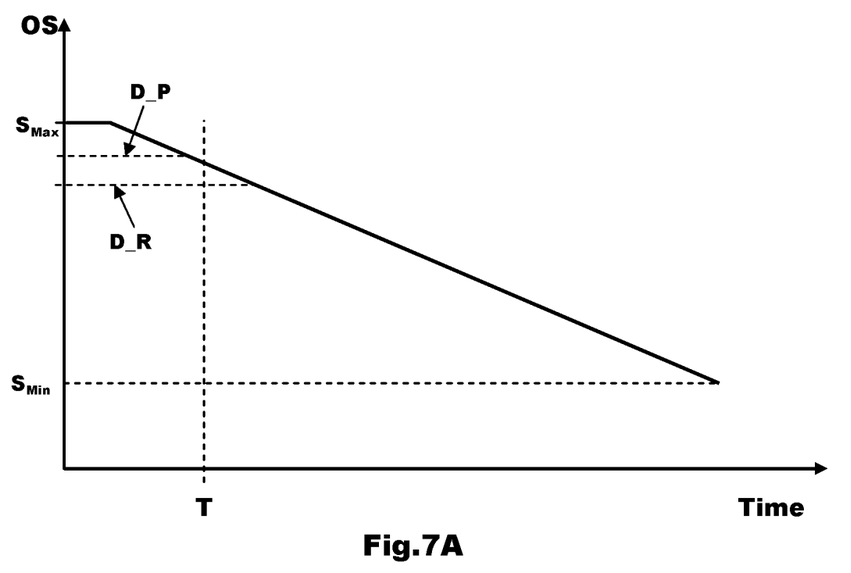
FIG. 7A is a graphical representation showing the relationship between the output signal from the slave cylinder piston position sensor 63 and time for an engine restart.
Figure 7B:
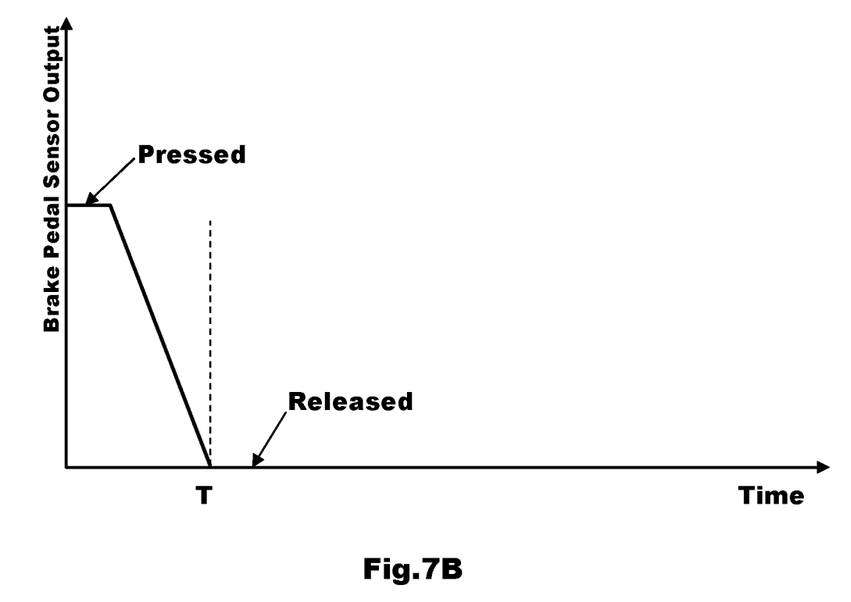
FIG. 7B is a graphical representation showing the relationship between brake pedal sensor output and time for the engine restart shown in FIG. 7A.

FIGS. 7A and 7B show respectively the releasing of the clutch pedal 25 and the releasing of the brake pedal 23 during an attempt by a driver to pull away after an engine stop.

An engine start trigger is provided in the case of this example when the output from the brake pedal sensor 24 falls to zero at time 'T'. It will be appreciated that other start triggers could be used and that the invention is not limited to the use of a brake pedal sensor equals zero trigger. For example and without limitation it would be possible to use a strategy to detect early release intent of the brake pedal, before it has been fully released by sensing rapid movement in the released direction from a brakes-held-on position.

As shown in FIG. 7A, due to the driver beginning to release the clutch pedal 25, the output signal (OS) from the slave cylinder piston position sensor 63 has already fallen below the level D_P at time 'T' and so, if only one threshold were to be provided, the engine 10 would not be restarted as it would be assumed that the clutch 2 is too engaged for an engine restart to be permitted. However, because the value of output signal (OS) at time 'T' is greater than the second threshold D_R, starting of the engine is permitted.

Therefore, if the same conservative threshold D_P (a threshold that is similar to the threshold that would be set if there were only a single threshold) were to be used for both engaging and disengaging of the clutch 2, then, in the case of this example, the engine 10 would be inhibited from starting because the output signal (OS) is, at time T, less than the first threshold D_P. Because a more aggressive second threshold D_R is used when the clutch 2 is being engaged (clutch pedal being released), the output signal (OS) is greater than the second threshold D_R at time T and so starting of the engine 10 is permitted.

Therefore, by using dual thresholds D_P and D_R in accordance with this invention an opportunity for starting the engine has not been lost.

Figure 3:
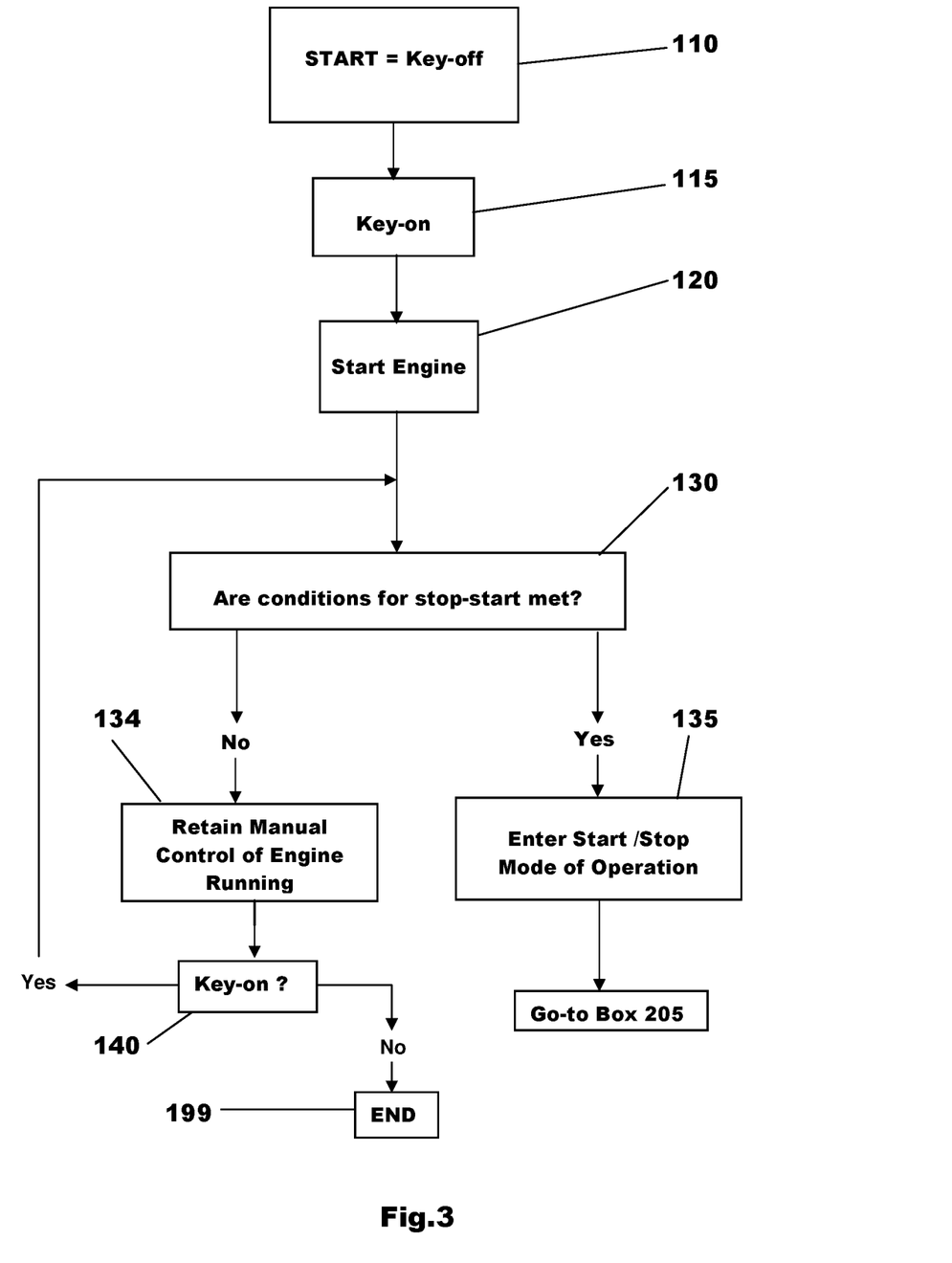
FIG. 3 is a high level flow chart showing the actions used for controlling the operation of an internal combustion engine forming part of the vehicle shown in FIG. 1.

Referring now to FIG. 3 there is shown a high level flow chart of the methodology used for determining whether to operate the motor vehicle in the first mode or second mode of operation.

The method starts at box 110 with the ignition key 17 in an 'off' position (key-off) and will stay in this state until at box 115 the ignition key 17 is moved to an 'on' position (key-on) which will start the engine 10 as indicated at box 120.

Then at box 130 it is determined whether the conditions for stop-start are met. That is to say, in box 130 it is decided whether to use the first or second mode of operation. One of these conditions used for this decision in the case of this example is whether the vehicle 5 is moving above a predetermined speed and, so far as this invention is concerned, if the vehicle is moving above a predetermined speed it is assumed that the manual or second mode of operation will be used. This is because this example is for use in controlling the stop-start operation of the engine 10 when the vehicle 5 is stationary. It will however be appreciated that, as previously referred to, the invention could be applied to a motor vehicle where the engine is shut-down with the transmission remaining in-gear while the motor vehicle is still moving (A Rolling Stop-Start Vehicle).

Other conditions that could be used to make this first or second mode decision are whether the ambient temperature is greater than a predefined temperature, whether a predefined level of passenger cabin comfort has been achieved, whether the current electrical accessory demand is less than a predefined levels or whether sensor plausibility checks have been completed.

Assuming that all of the conditions that need to be met are present when checked in box 130, the method will advance from box 130 to box 135 where the first mode of operation is selected and then on to box 205. However, if all of the conditions that need to be met are not present when checked in box 130, the method will advance to box 134 where the second or normal mode of operation is selected. After box 134 the method advances to box 140 to determine whether the ignition key 17 is still in the on position. If the ignition key 17 is still in the on position (key-on) then the method returns to box 130 with the engine running but if the ignition key 17 is determined to be in the off position (key-off) the method ends at box 199.

It will be appreciated that whenever a key-off event occurs the method will end.

Referring now to FIGS. 4 to 6B from box 135 the method has advanced to box 205 where clutch engagement state thresholds are set. The clutch engagement state thresholds set are based upon the output signal from the slave cylinder piston position sensor 63 which measures the position of the slave cylinder piston 62.

The slave cylinder piston position sensor 63 is calibrated such that when the clutch pedal 25 is not being touched the output signal (OS) from the slave cylinder piston position sensor 63 is equal to $S_{Min}$ and when the clutch pedal 25 is fully depressed the signal from the slave cylinder piston position sensor 63 is equal to $S_{Max}$. Three zones of clutch engagement state known as Released (R), Pressed (P) and Depressed (D) are shown on FIG. 5 as they relate to the position of the clutch pedal 25 and corresponding slave cylinder piston zones are defined based upon a relationship between clutch pedal position and slave cylinder piston displacement ($D_{Slave}$). The corresponding output signal (OS) values from the slave cylinder piston position sensor 63 for the zones 'R', 'P' and 'D' are shown on FIGS. 6A and 6B.

Figure 5:
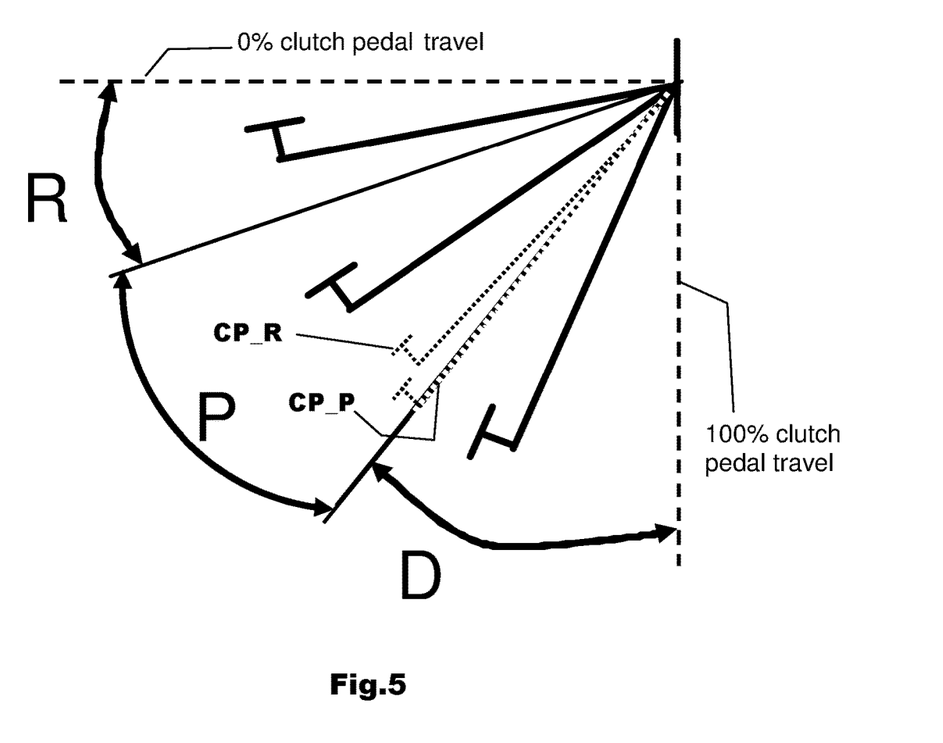
FIG. 5 is a diagram showing various clutch pedal positions and their relationship to three clutch engagement zones.

When the clutch pedal 25 is in the released zone (R) the clutch 2 is always fully engaged.

When the clutch pedal 25 is in the pressed zone (P) the clutch pedal 25 has been displaced from its resting position, any slack or free play in the clutch actuation system has been absorbed and the disengagement or engagement of the clutch 2 is commencing. The bite point of the clutch 2 is located in the pressed zone 'P' and in the case of this example is close to the interface between the pressed zone 'P' and the depressed zone 'D'.

When the clutch pedal 25 is in the depressed zone (D), the clutch pedal 25 has been displaced considerably from its resting position and is approaching a fully displaced position. Therefore in the depressed zone the clutch 2 is disengaged and is not able to transmit torque.

In the case of this invention two control thresholds D_P and D_R are used dependent upon whether the motion of the clutch pedal 25 is toward the fully depressed position or toward the fully released position. That is to say, there is a first threshold D_P when the clutch 2 is being disengaged (the clutch pedal 25 is being pushed down) and a second threshold D_R when the clutch 2 is being engaged (clutch pedal 25 is being released).

When the clutch pedal 25 is moving toward the fully depressed position causing the clutch 2 to be disengaged, a very conservative threshold, the first threshold D_P is used. The equivalent slave cylinder piston displacement ($D_{Slave}$) from the fully released position in terms of the output signal (OS) from the slave cylinder piston position sensor 63 defined as the first threshold D_P is shown on FIG. 6A. When the output signal (OS) from the slave cylinder piston position sensor 63 is equal to but preferably greater than this first threshold value (D_P) it is guaranteed that the clutch 2 is disengaged and that no torque can be transferred by the clutch 2. The first threshold D_P therefore defines the extent of the depressed zone 'D'.

Figure 6A:
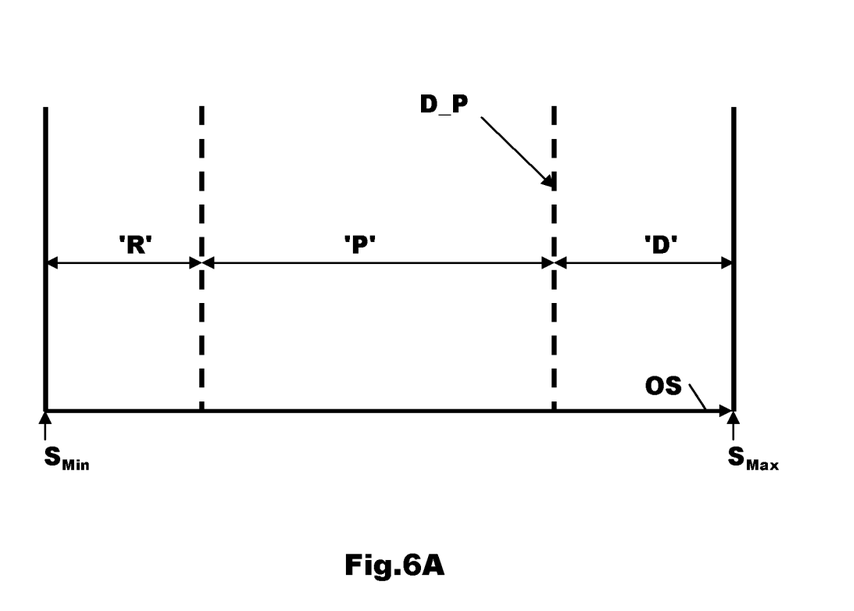
FIG. 6A is a diagram showing the three engagement zones of FIG. 5 in relation to the magnitude of an output signal from a slave cylinder piston displacement sensor when the clutch pedal is displaced and showing a first threshold for use when the clutch is being disengaged.
Figure 6B:
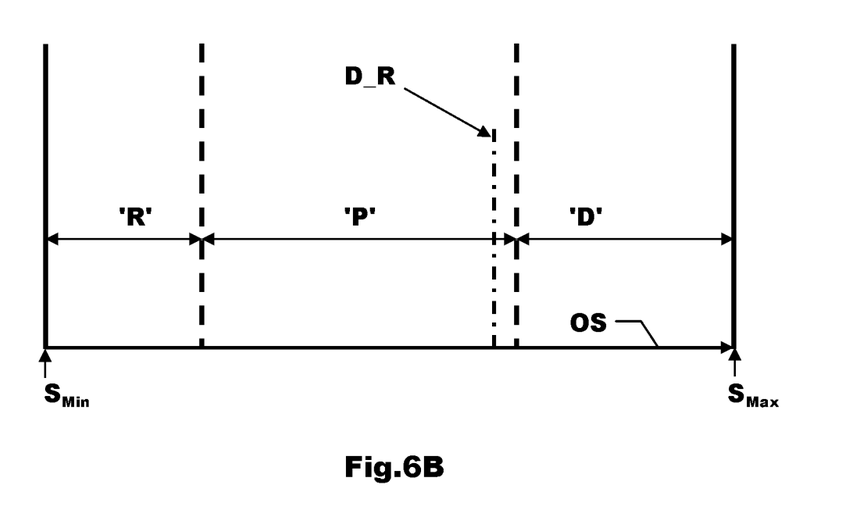
FIG. 6B is a diagram showing the three engagement zones of FIG. 5 in relation to the magnitude of the output signal from a slave cylinder piston displacement sensor when the clutch pedal is displaced and showing a second threshold for use when the clutch is being engaged.

When the clutch pedal 25 is moving towards the fully released position so as to engage the clutch 2, that is to say, away from the fully depressed position, a less conservative threshold, the second threshold D_R, is used that corresponds approximately in the case of this example to the bite point of the clutch 2. D_R is the last guaranteed point at which it is not possible to transmit sufficient torque via the clutch to cause undesirable vehicle movement for a worst case tolerance stack-up.

The equivalent slave cylinder piston displacement ($D_{Slave}$) from the fully released position in terms of the output signal (OS) from the slave cylinder piston position sensor 63 defined as threshold D_R is shown on FIG. 6B. It will be appreciated that the exact location of this threshold D_R will depend upon how close the bite point lies to the juncture of the pressed and depressed zones 'P' and 'D'.

When the output signal (OS) from the slave cylinder piston position sensor 63 is equal to but preferably greater than this second threshold D_R the clutch 2 is assumed to be disengaged sufficiently that no significant torque can be transferred by the clutch 2. At or close to the threshold D_R, the state of the clutch 2 is changing from disengaged to a partially engaged state due to the proximity of the threshold D_R to the bite point of the clutch 2. Therefore it is possible that some torque can be transmitted by the clutch 2 when the sensed displacement of the slave cylinder piston 62 approaches the second threshold D_R, this will depend upon tolerances in the clutch system of a particular vehicle such as manufacturing tolerance as well as the state of wear of the clutch system and operating temperatures of the various components of the clutch system. The calibration of the second threshold D_R is such that the magnitude of any torque transmitted when OS=D_R is not sufficient to produce undesirable movement of the motor vehicle 5.

It will be appreciated that there is a calibrated relationship between the actual displacement $D_{Slave}$ of the slave cylinder piston 62 and the equivalent sensor output (OS) from the slave cylinder piston position sensor 63. The calibration of the slave cylinder piston position sensor 63 therefore has to take into account this relationship along with all of the various tolerances and noise factors for the clutch 2 and the actuation system for the clutch 2.

Figure 4:
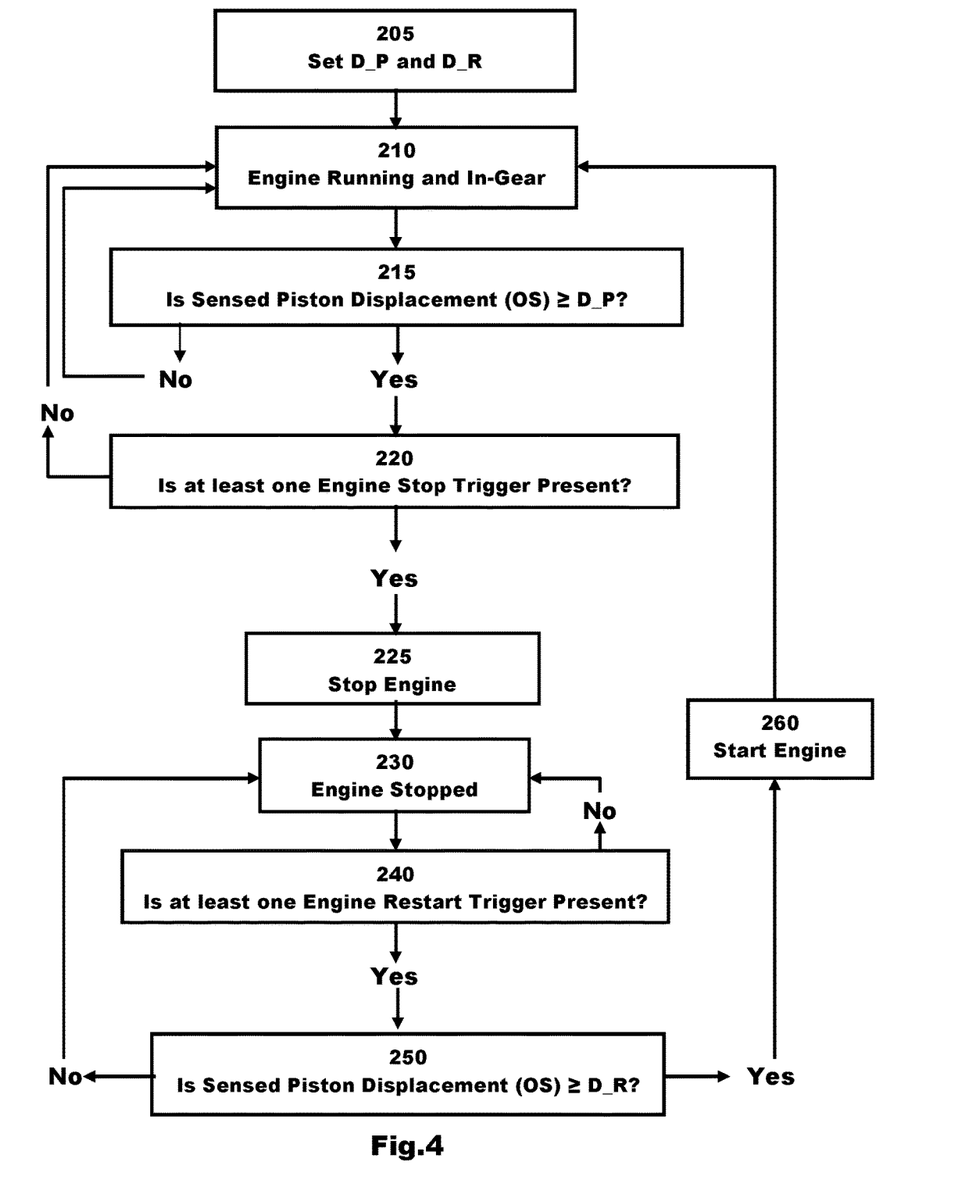
FIG. 4 is a high level flow chart showing a method of controlling the starting and stopping of the engine shown in FIG. 1.

It will also be appreciated that the specific values chosen for the first and second thresholds D_P and D_R may not be fixed values but could be varied to take into account or compensate for wear of the clutch 2 such as wear of the driven plate 7 as well as changes in the clutch release mechanism itself. Therefore, when the stop-start or first mode is selected, the first and second thresholds D_P and D_R are set in box 205 to allow for adjustment of these values over time if such a compensation technique is employed.

The equivalent clutch pedal positions CP_P and CP_R to the first and second thresholds D_P and D_R are shown on FIG. 5 as dotted outlines.

Referring back to box 205 the method advances to box 210 where the engine 10 is running and the transmission 11 is in-gear. It will be appreciated that the order of boxes 205 and 210 could be reversed.

From box 210, the method advances to box 215 where the current output signal (OS) from the slave cylinder piston position sensor 63 is compared to the first clutch disengagement threshold D_P. It will be appreciated that during normal running of the motor vehicle 5 the clutch 2 will be fully engaged while the transmission 11 is in-gear and so the only option is for the driver to disengage the clutch 2. Therefore the relevant threshold will always be the first threshold D_P when the vehicle is to be brought to a halt. However, there could be an additional step to determine which threshold to use and this would be particularly applicable in the case of a rolling stop-start vehicle. For example, if the signal from the slave cylinder piston position sensor 63 is increasing then it can be inferred that the clutch 2 is being disengaged and conversely if the signal from the slave cylinder piston position sensor 63 is decreasing then the clutch 2 is being engaged. It will also be appreciated that the opposite change in output signal (OS) could be used if the magnitude of the signal from the slave cylinder piston position sensor 63 decreases as the clutch 2 is disengaged.

Referring back to box 215, if the value of output signal (OS) from the slave cylinder piston position sensor 63 is less than D_P then the clutch 2 is assumed to be engaged and so the method returns to box 210. That is to say, there is not currently an opportunity to stop or shutdown the engine 10. However, if the output signal (OS) from the slave cylinder piston position sensor 63 is equal to or preferably greater than D_P, then the clutch 2 is assumed to be disengaged and so there is an opportunity to stop or shutdown the engine 10 and the method will advance from box 215 to box 220.

In box 220 it is checked whether at least one engine stop trigger is present. Examples of engine stop or shutdown triggers are that the brake pedal 23 is being pressed, that the accelerator pedal 18 is not being pressed or that a parking brake has been applied. If at least one of these triggers is present then the method advances from box 220 to box 225 where the engine 10 is shutdown so that as indicated by box 230 it stops. Otherwise the method returns from box 220 to box 210 with the engine 10 still running.

It will be appreciated that boxes 215 and 220 could be combined by requiring both of the requirements given in boxes 215 and 220 to be present for the method to advance to box 225. If either requirement is not present then the method would return to box 210.

Returning to box 230, the method advances from box 230 with the engine stopped to box 240 to check whether at least one start trigger is present.

Examples of these start triggers are, that the brake pedal 23 is not being pressed, is being released, is being released faster than a predefined rate or has been released, that the accelerator pedal 18 is being pressed or that a parking brake has been released. If at least one of these start triggers is present, the method advances from box 240 to box 250, otherwise the method returns from box 240 to box 230 with the engine 10 still stopped.

If at least one of the restart triggers is present when checked in box 240, the method advances from box 240 to box 250 where the current output signal (OS) from the slave cylinder piston position sensor 63 is compared to the second clutch disengaging threshold D_R. It will be appreciated that to reach box 250 the clutch 2 will have been disengaged and for a take-off from rest or to restart the engine while it is still rolling the driver has to engage the clutch 2. Therefore the relevant threshold will be the second threshold D_R. However, as referred to previously, there could be an additional step to determine which threshold to use.

If the current output signal (OS) from the slave cylinder piston position sensor 63 when compared in box 250 is greater than or equal to the second threshold D_R then the method advances to box 260 where the engine is restarted and then returns to box 210 with the engine 10 running and the transmission 11 in-gear. However, if when compared in box 250, the current output signal (OS) from the slave cylinder piston position sensor 63 is less than the second threshold D_R, the method returns to box 230 with the engine 10 still stopped. This is because the clutch 2 could be engaged sufficiently to cause a problem if the engine 10 were to be restarted.

It will be appreciated that if a key-off event occurs at any time during execution of the method then the method will terminate.

It will be appreciated that the method shown in FIGS. 3 and 4 could be encoded as executable steps in the electronic controller 16.

Therefore, in summary, a first conservative clutch disengagement threshold limit is used when the clutch is being disengaged and a second less conservative clutch disengagement threshold limit is used when the clutch is being engaged. By using two different thresholds depending upon whether the clutch is being engaged or disengaged the invention provides stopping and starting of an engine while reducing the number of failed restarts.

Although in the example provided the first and second clutch disengagement threshold limits are set as values of an output signal from a slave cylinder piston position sensor associated with a slave cylinder, such as a concentric slave cylinder, it will be appreciated that the two threshold limits could be set and tested in another manner.

For example and without limitation, movement of the release bearing could be sensed by a position sensor and the output signal from the release bearing sensor used for comparison against signal values equating to the first and second thresholds, or clutch master cylinder piston sensing, clutch pedal position sensing or clutch line pressure sensing could be used with the respective output signals being compared to signal values equating to the first and second thresholds.

It will be appreciated by those skilled in the art that although the invention has been described by way of example with reference to one or more embodiments it is not limited to the disclosed embodiments and that one or more modifications to the disclosed embodiments or alternative embodiments could be constructed without departing from the scope of the invention as set out in the appended claims.

What is claimed is:

1. An engine control method for a vehicle, comprising:
stopping the engine, by a controller, in response to disengaging a manual transmission clutch and the clutch being more disengaged than a first clutch disengagement threshold; and
restarting the engine, by the controller, in response to engaging the clutch and the clutch being more disengaged than a second clutch disengagement threshold corresponding to a less disengaged clutch state than the first clutch disengagement threshold.

2. The method of claim 1 further comprising stopping the engine in response to at least one engine stop trigger.

3. The method of claim 2 further comprising inhibiting stopping the engine in response to the clutch being less disengaged than the first clutch disengagement threshold.

4. The method of claim 2, the at least one engine stop trigger comprising a brake pedal being pressed.

5. The method of claim 1 further comprising restarting the engine in response to at least one engine restart trigger.

6. The method of claim 5 further comprising inhibiting restarting the engine in response to the clutch being less disengaged than the second clutch disengagement threshold.

7. The method of claim 5 wherein the at least one engine restart trigger corresponds to a vehicle brake pedal having been released, or the vehicle brake pedal currently being released.

8. The method of claim 5, the at least one engine restart trigger including a vehicle brake pedal being sensed to be released and a vehicle accelerator pedal sensed to be pressed.

9. The method of claim 1, the first clutch disengagement threshold corresponding to a position of the clutch where no torque can be transmitted by the clutch.

10. The method of claim 1, the second clutch disengagement threshold corresponding to a bite point of the clutch such that any torque that can be transmitted by the clutch is insufficient to move the vehicle.

11. The method of claim 1, the clutch being actuated by a clutch actuation system including a slave cylinder having a piston arranged to move a release bearing of the clutch and a slave cylinder piston position sensor to provide an output signal indicative of a position of the piston of the slave cylinder, wherein the first clutch disengagement threshold is a first assigned value of output signal from the slave cylinder piston position sensor and, if a magnitude of the output signal from the slave cylinder piston position sensor is not less than the first assigned value of output signal from the slave cylinder piston position sensor, the clutch is considered to be sufficiently disengaged to permit stopping the engine.

12. The method of claim 1, the clutch being actuated by a clutch actuation system including a slave cylinder having a piston arranged to move a release bearing of the clutch and a slave cylinder piston position sensor to provide an output signal indicative of a position of the piston of the slave cylinder, wherein the second clutch disengagement threshold is a second assigned value of the output signal from the slave cylinder piston position sensor and, if a magnitude of the output signal from the slave cylinder piston position sensor is not less than the second assigned value of output signal from the slave cylinder piston position sensor, the clutch is considered to be sufficiently disengaged to permit restarting of the engine.

13. A vehicle comprising:
a manually operated clutch connecting an engine and a transmission; and
a controller automatically stopping and starting the engine in response to a stop trigger, a start trigger, and a signal indicative of engagement state of the clutch relative to:
a first clutch threshold when the clutch is being disengaged and, when the clutch is being engaged, a second clutch threshold representing a less disengaged clutch state than the first clutch threshold.

14. The vehicle of claim 13 further comprising:
a clutch actuation system including a slave cylinder having a piston arranged to move a release bearing of the clutch and a slave cylinder piston position sensor to provide the signal indicative of the engagement state of the clutch based on position of the piston.

15. The vehicle of claim 13, the first clutch threshold corresponding to a position of the clutch where no torque can be transmitted by the clutch.

16. The vehicle of claim 13, the second clutch threshold corresponding to a bite point of the clutch such that any torque transmitted by the clutch is insufficient to move the vehicle.

17. A vehicle comprising:
a processor programmed to stop and start an engine based on a position signal for a clutch of a manual transmission with the transmission in-gear, the processor stopping the engine with the transmission in-gear in response to the position signal exceeding a first threshold, and starting the engine with the transmission in-gear in response to the position signal exceeding a second threshold corresponding to less clutch disengagement than the first threshold.

18. The vehicle of claim 17 further comprising a clutch actuation system having a cylinder and piston arranged to move a release bearing of the clutch, the position signal corresponding to position of the piston within the cylinder.

19. The vehicle of claim 17, the first threshold corresponding to a position of the clutch where no torque is transmitted by the clutch.

20. The vehicle of claim 17, the second threshold corresponding to a bite point position of the clutch.

* * * * *